United States Patent [19]

Telle

[11] Patent Number: 5,053,885

[45] Date of Patent: Oct. 1, 1991

[54] COPIER WITH AUTO SCALING, AUTO PAPER SELECT, AND WINDOW SCALING

[75] Inventor: Lawrence B. Telle, Rochester, N.Y.

[73] Assignee: Eastman Kodak Company, Rochester, N.Y.

[21] Appl. No.: 443,542

[22] Filed: Nov. 30, 1989

[51] Int. Cl.[5] ............................................. H04N 1/40
[52] U.S. Cl. .................................. 358/449; 358/451; 382/47
[58] Field of Search ................... 358/449, 451; 382/47

[56] References Cited

U.S. PATENT DOCUMENTS

| | | | |
|---|---|---|---|
| 4,532,602 | 7/1985 | DuVall | 364/577 |
| 4,562,485 | 12/1985 | Maeshima | 358/280 |
| 4,580,171 | 4/1986 | Arimoto | 358/280 |
| 4,672,186 | 6/1987 | Van Tyne | 358/464 |
| 4,679,096 | 7/1987 | Nagashima | 358/287 |
| 4,814,893 | 3/1989 | Katoh | 358/296 |
| 4,922,350 | 5/1990 | Rombola et al. | 358/465 |

Primary Examiner—Joseph A. Orsino
Assistant Examiner—Dov Popovici
Attorney, Agent, or Firm—Milton S. Sales

[57] ABSTRACT

A copier has the capability to determine the size of the original document, or a designated portion thereof, for purposes of auto scaling, auto paper select, and/or window scaling, to set image magnification parameters, and to process the image signal according to the set parameters in but a single scan of the original document. The copier forms an image on a copy sheet based on a supplied series of electrical data signals. Document recognition determines the size of an original document from a series of electrical data signals, and a series of electrical data signals representative of the image content of a document is stored in memory. The size of a copy sheet and the size of the formed image are matched in accordance with the document recognition in response to but a single scan of an original document. A portion of an original document and a magnificaiton ratio may be designated for scaling.

7 Claims, 3 Drawing Sheets

COPIER WITH AUTO SCALING, AUTO PAPER SELECT, AND WINDOW SCALING

BACKGROUND OF THE INVENTION

1. Technical Field

This invention relates generally to electronic copiers, and more particularly to such copiers capable of processing an image signal to adjust magnification to fit a selected copy sheet size, to automatically select a copy sheet size to fit an original document size, and to change the magnification of a portion of an original document.

2. Background Art

It will be appreciated that it may be desirable to be able to alter the effective size of the scanned image to print either an enlarged or reduced version of the image. Image magnification, either reduction or enlargement, may be accomplished in several ways. In DuVall U.S. Pat. No. 4,532,602, a sequence of digital scan values are sampled at frequencies greater or less than the frequency at which the values are produced to provide a sequence of output scan values differing in number from the sequence of input scan values. The size of the image is altered by the ratio of frequencies. In Nagashima U.S. Pat. No. 4,679,096, a read clock generator and a write clock generator vary the frequency of reading data from and writing data to a memory in accordance with a magnification factor.

In many prior art copiers, the magnification factor is automatically selected to match the image size to the size of the copy sheet upon which it is to be reproduced. This feature is known as "auto scaling." Another feature also found on prior art copiers is referred to as "auto paper select," wherein the copy sheet is automatically chosen from a variety of supply sizes to most closely match the size of the original document. To effect auto scaling, both the size of the original document and the size of the copy sheet must be determined before a magnification factor is selected. To effect auto paper select, the size of the original document and of the available copy sheets must be known before a copy sheet size can be selected.

Determining the size of the copy sheet is generally not a problem, and may be accomplished by means of sensors and/or cassette coding. Determining of the size of the original document may be by means of a manual setting by the operator, but this requires an additional operation during machine set-up, and is therefore less desirable than so called "document recognition" techniques, wherein the original document is pre-scanned to gather sufficient data regarding the size and position of an original document on the scanner platen. During a subsequent scan, the image signal is processed according to the size of the original document determined using the data collected during the first scan.

A copier's life is in part limited by the physical number of times the image is scanned, and the inconvenience of the operators is measured in part by the time duration they must wait to remove the original after pressing the start button. A copier which requires only a single scan to determine the size of the original, to determine the magnification factor, and to read the image data would be very preferable to a copier which requires two or more scans for the same functions.

Copiers are also known wherein designated portions, called windows, of the original image are scaled (enlarged or reduced) according to the operator's request. The designation of the window boundaries may be accomplished such as for example by means of a digitalization tablet. After the boundaries are selected, the document is scanned a first time to collect image data of the portion of the original image which lies outside the window boundaries and to process that portion. The document is scanned a second time to capture the portion of the original image which lies inside the window boundaries, effect magnification thereon, and record the magnified image in a overlaid manner with the first portion. Again, the copier's life and the convenience of the operators are negatively impacted by the need to double scan the original.

3. Disclosure of Invention

It is an object of the present invention to provide a copier with the capability to determine the size of the original document, or a designated portion thereof, for purposes of auto scaling, auto paper select, and/or window scaling; to set image magnification parameters; and to process the image signal according to the set parameters in but a single scan of the original document.

In accordance with a feature of the present invention, an electronic copier includes means for forming an image on a copy sheet based on a supplied series of electrical data signals, document recognition means for determining the size of an original document from a series of electrical data signals, memory means for storing a series of electrical data signals representative of the image content of a document and for applying the stored electrical signals to the image forming means, means responsive to the document recognition means for matching the size of a copy sheet and the size of the image formed by the image forming means, and scanning means for generating during a single scan of a document a series of electrical data signals representative of the size and image content of the documents and for applying the generated signals to the document recognition means and to the memory means.

According to a preferred embodiment of the invention, the means for matching the size of a copy sheet and the size of the formed image includes means for scaling the image data signals applied to the image forming means such that the size of the formed image matches the size of a copy sheet, and means for reading the stored series of data signals from the memory means and for applying them to the scaling means. Means may be provided for signaling the size of a selected copy sheet so that a magnification factor may be calculated based on the size of the original document and the size of the selected copy sheet. All of the aforementioned operations are effected in response to but a single scan of an original document. A supply of different size sheets may be provided along with means for selecting a copy sheet from the supply such that the size of the copy sheet corresponds to the size of the original document. The memory means may be adapted to retain the scanned series of data signals even after an image is formed, whereby the matching means can be adjusted and another image formed.

In accordance with another feature of the present invention, an electronic copier for reproducing an image of an original document onto a copy sheet includes means for designating a portion of an original document for scaling, means for designating the magnification of the designated portion, scaling means for scaling the designated portion of received image data and for merging the scaled data with the data from the portion of the original document not designated, memory means for storing a series of electrical data signals representative of the image content of a document and for applying the stored data to the scaling means, image forming means for forming an image on a copy sheet based on a supplied series of electrical data signals, and scanning means for generating, during a single scan of a document, a series of electrical data signals representative of the image content of the documents, and for applying the generated signals to the memory means. Preferably, the memory means is at least twice the size of the image, whereby the memory means can save the merged image without overwriting the original image.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
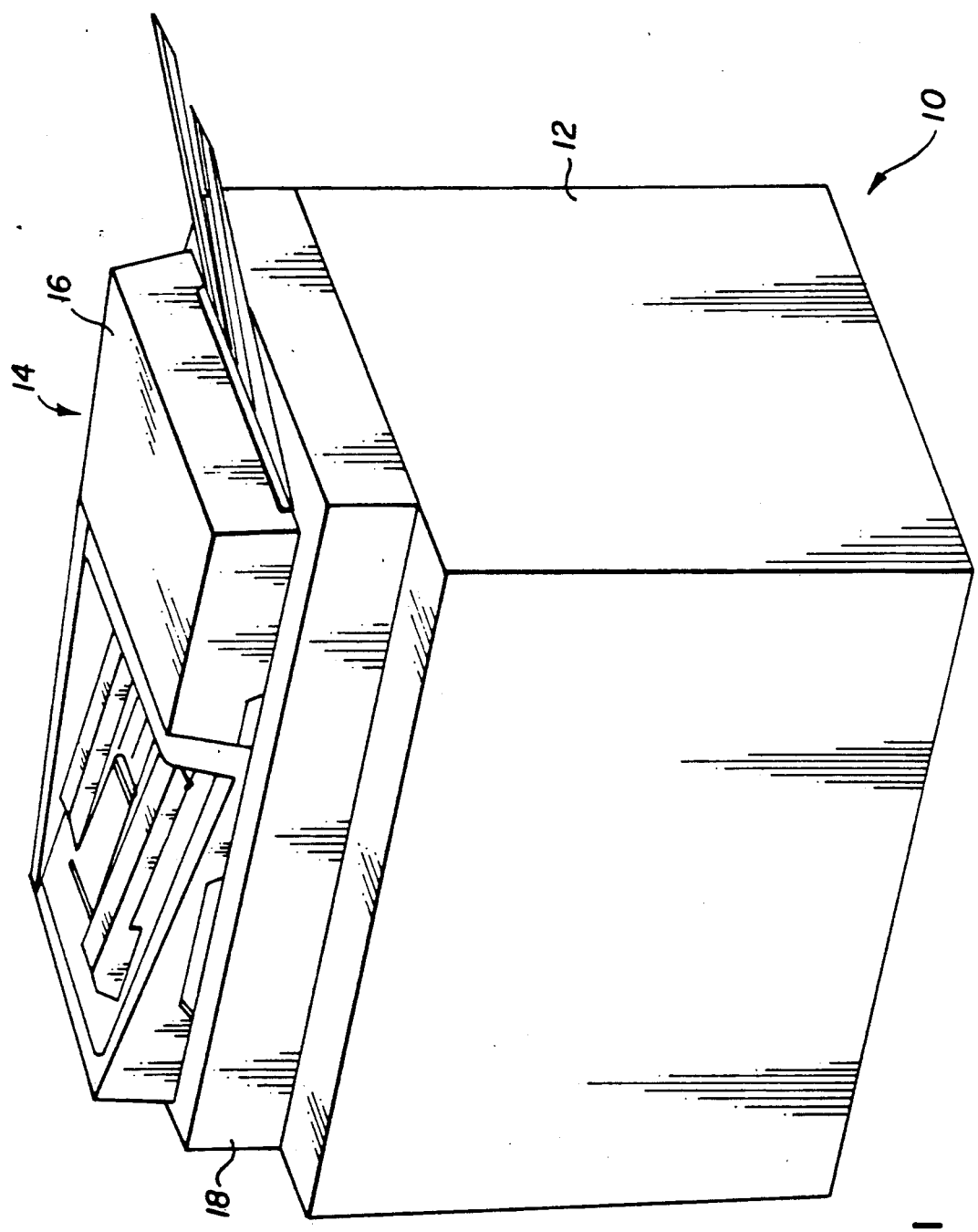
FIG. 1 is a perspective view of a copier according to one embodiment of the present invention.

According to FIG. 1, a copier 10 includes a marking engine 12 and a document scanner 14. Scanner 14 consists of an automatic document handler 16 for stream feeding multiple hard copy original documents past an optical system enclosed in an optics housing 18. Focused light reflected from an original document image is swept past a linear array of phototransducers, such as photodiodes or charge coupled devices, for scanning the image of an original document and converting the scanned image into electrical signals having values representative of the image density at associated pixel areas on the original document.

As the scanning of the original document proceeds in a direction perpendicular to the row of pixel areas, a series of output signals from the transducers are repetitively loaded into an associated shift register and shifted out serially to provide a series of electrical signals having values representative of the image density of respective pixel areas in corresponding rows of pixel areas across the document image.

Figure 2:
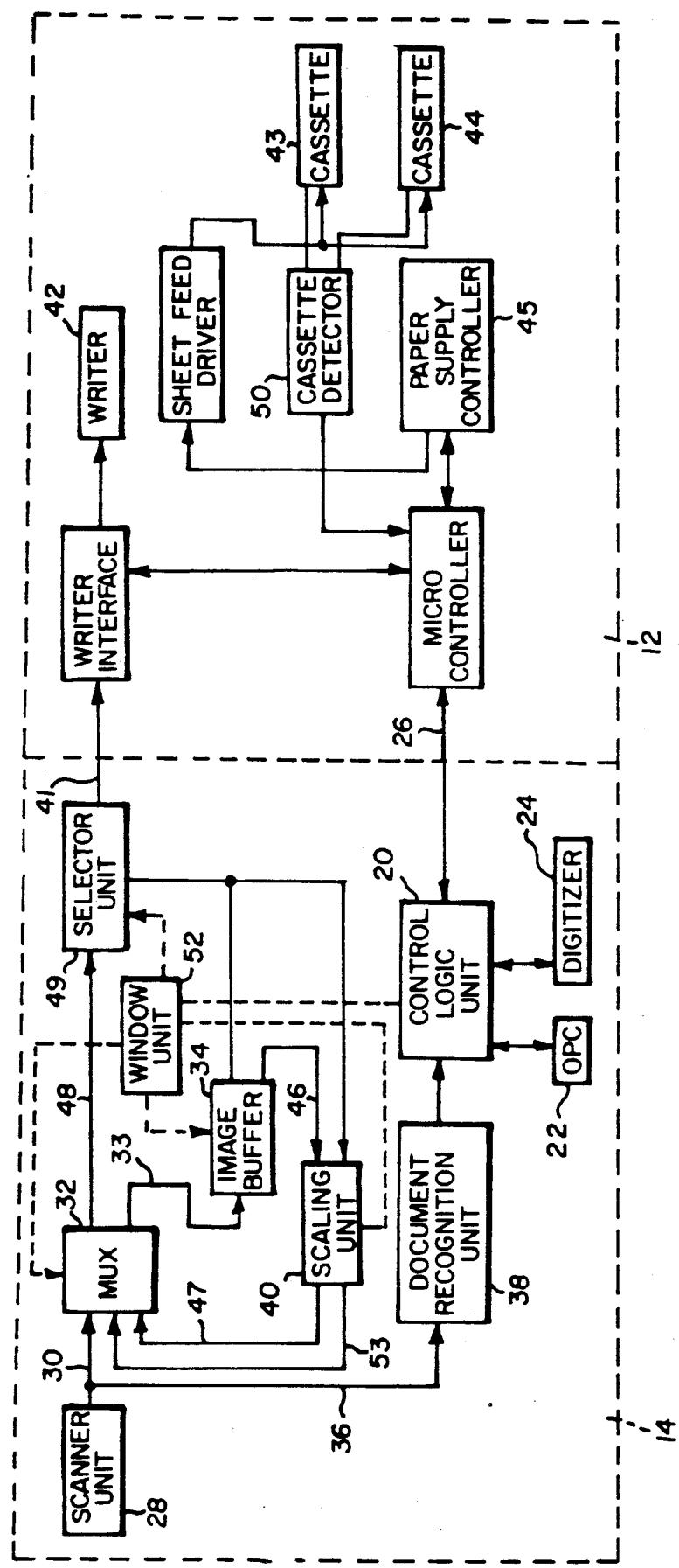
FIG. 2 is a schematic block diagram of the copier of FIG. 1.

Referring to FIG. 2, document scanner 14 includes a control logic unit 20 having an operator control panel 22 and digitizer 24. The control logic package is an interfacing medium for the operator to input functions and to receive messages from the copier. Setup instructions, including magnification factors and window scaling coordinates, are input to the scanner, while information for finishing and processing of jobs will be sent to marking engine 12 via a job control communications link 26. The logic package consists of control software, interface software, and logic hardware.

Digitizer 24 may take any of several well known forms such as the digitizing tablet disclosed in U.S. Pat. No. 4,791,450, wherein an original is placed face up on the tablet. A stylus associated with the tablet is used by the operator to designate various positions on the original. Transducers located beneath the original produce signals relating the position of the positions touched relative to an edge of the tablet. Alternatively, the tablet may be of the known sonic type wherein a spark formed by a stylus creates sound waves in the air which are sensed by microphones placed along the sides of the tablet or wherein a sensor is placed in the stylus and sources at known points on the sides of the tablet emit sonic signals.

Signals from a scanner unit 28 (which includes the phototransducer and associated electronics) are transmitted along an image data bus 30. The signals pass through a multiplexer 32 unmodified, and along a bus 33 for storage in a full page image buffer 34. By "unmodified" it is meant in a form in which the image content of the original can be retrieved.

As an original document is scanned into image buffer 34, the image signal passes pixel by pixel along bus 36 into a document recognition unit 38. The document recognition unit has the capability of determining the size and location of an original document on the scanner platen. Conventionally, document recognition units identify the boundaries of an original document by detecting contrast between the white area of the document and the dark area surrounding the document. This operation is effected in hardware and software routines selectable from several well known in the art. In the preferred embodiment of the present invention, the leading intrack and crosstrack edges of the document are detected when the video data first moves above the threshold value for a predetermined number of adjacent pixels. Once the leading edges are sensed, the system stores the coordinates and looks for the trailing edges by requiring that the video data go, and stay, below the threshold value. The positions of the first and last detected white pixels in the intrack and crosstrack directions are used by control logic unit 20 for determining the size and position of the original document on the platen.

Marking engine 12 receives electrical bit stream signals over a data bus 41 and job control data over communications link 26. After appropriate processing, the image signals are inputted to a writer 42 for forming images on receiver sheets. The writer receives copy sheets of a particular size from one of a plurality of cassettes 43 and 44 as determined by a paper supply controller 45.

In the auto scaling mode, the image to be reproduced is scaled (enlarged or reduced) to fit the selected copy sheet. The size of the original document has been determined by document recognition unit 38. This, and the size of the selected copy sheet, are provided to control logic unit 20, which calculates a magnification factor such that the reproduced image fits on the copy sheet. The magnification factor is loaded into scaling unit 40. Image signals read from buffer 34 onto a bus 46 are scaled by the magnification factor in unit 40 (such as by conventional pixel replication and dropping techniques) and then passed over a bus 47 to multiplexer 32. The multiplexer switches the scaled signal onto a bus 48 to a selector unit 49. The selector unit will have been directed to accept data from bus 48 and to pass it to bus 41.

Figure 3:
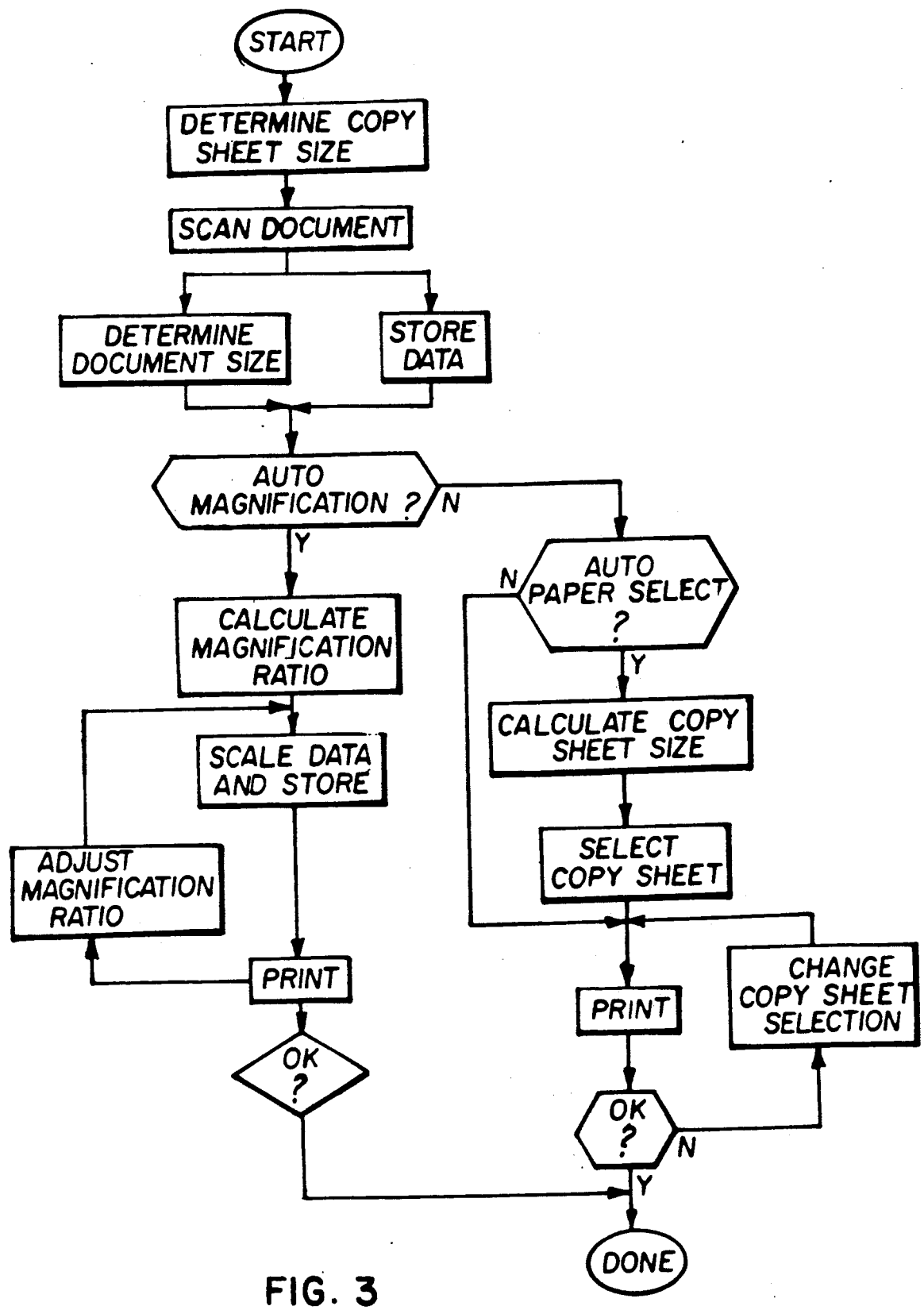
FIG. 3 is a logic flow chart showing the auto scaling and the auto paper select modes.

In the auto paper select mode, the size of the original document as determined by document recognition unit 38 is compared to the sizes of copy sheets available in cassettes 43 and 44 as determined by a cassette detector 50. The "best fit" copy sheet available is selected according to any selection criteria desired, such as by selecting the smallest size available that does not clip the original in either length or width. Once the paper supply is determined, a message is sent over bus 26 directing paper supply controller 45 to use the desired cassette. Upon confirmation, the image is transmitted from buffer 34 via a bus 51 to selector unit 49. The selector unit will have been directed to accept data from bus 51 and to pass it to bus 41. FIG. 3 is a logic flow chart showing the steps just explained for the auto scaling and the auto paper select modes.

Operation of the copier in the window scaling mode will now be explained. Using digitizer 24, an operator designates coordinates of the original document at which is located the portion of the image to be scaled. The operator then identifies the magnification factor for that portion. This identification may be done by designating the coordinates within which the portion is to appear on the copy, or by keying in a numerical magnification factor.

The original is then scanned and control logic unit 20 programs a window control unit 52 to cause multiplexer 32 to direct the image data via bus 33 for storage in image buffer 34. Selector unit 49 is caused to select neither path 48 or 51, so no data is passed to bus 41. After the image has been captured by buffer 34, control logic unit 20 programs window control unit 52 with new instructions to count the pixels and lines of the image, and to control the "on" and "off" times of all following window-controlled features.

Window control unit 52 directs image buffer 34 to start reading the image out on to bus 51. Scaling unit 40 processes the data at 100% magnification and passes it over a bus 53 through multiplexer 32 back to image buffer 34 via bus 33, to the printer via bus 48 and selector unit 49, or both. Image buffer 34 is preferably at least twice the size of the image so that the buffer can save the "recirculated" image into an empty area of memory without overwriting the original image.

In parallel with the read option on bus 51, window control unit 52 directs image buffer 34 to find the window location and to put the data therein onto bus 46. When the data on bus 53 reaches one of the window boundaries, window control unit 52 will direct scaling unit 40 to start scaling bus 46 data and to put it onto bus 47. Multiplexer 32, being controlled by window control unit 52, will merge and/or replace the full page data on bus 53 with the windowed scaled data on bus 47. Image buffer then sends the data either on to selector unit 49 for printing or back to scaling unit 40 for more scaling.

The first print of a page by the marking engine may be considered to be a test print. The operator, upon viewing the test print may decide that the magnification factor is incorrect. If so, the operator may adjust the scaling factor, and a second test print, or a production print, may now be produced without rescanning the original document since the full image content remains in image buffer 34 until the next original document is scanned into the buffer.

By placing image buffer 82 offline, it can retain the unmodified image until a test print has been run and accepted by the operator. In that way, merging, scaling, and color adjustments and substitutions (as explained above) can be inspected and, if unacceptable, redone from the original image data.

The invention has been described in detail with particular reference to preferred embodiments thereof, but it will be understood that variations and modifications can be effected within the spirit and scope of the invention.

What is claimed is:

1. An electronic copier for reproducing an image of an original document onto a copy sheet; said copier comprising:
    image forming means for forming an image on a copy sheet based on a supplied series of electrical data signals;
    document recognition means for determining the size of an original document from a series of electrical data signals;
    memory means for storing a series of electrical data signals representative of the image content of a document, and for applying the stored electrical signals to said image forming means;
    means, responsive to the document recognition means, for matching the size of a copy sheet and the size of the image formed by said image forming means; and
    scanning means for generating, during a single scan of a document, a series of electrical data signals representative of the size and image content of the documents, and for applying the generated signals to said document recognition means and to said memory means.

2. An electronic copier as set forth in claim 1 wherein said means for matching the size of a copy sheet and the size of the formed image includes:
    scaling means for scaling the image data signals applied to said image forming means such that the size of the formed image matches the size of a copy sheet; and
    means for reading the stored series of data signals from said memory means and for applying them to said scaling means.

3. An electronic copier as set forth in claim 1 wherein said means for matching the size of a copy sheet and the size of the formed image includes:
    means for signaling the size of a selected copy sheet;
    means for calculating a magnification factor based on the size of the original document and the size of the selected copy sheet;
    scaling means for scaling the image data signals applied to said image forming means by the magnification factor; and
    means for reading the stored series of data signals from said memory means and for applying them to said scaling means.

4. An electronic copier as set forth in claim 3 wherein all of said aforementioned means are adapted to operate in response to but a single scan of an original document.

5. An electronic copier as set forth in claim 1 wherein said means for matching the size of a copy sheet and the size of the formed image includes:
    a supply of different size sheets; and
    means for selecting a copy sheet from said supply such that the size of the copy sheet corresponds to the size of the original document.

6. An electronic copier as set forth in claim 1 wherein said memory means is adapted to retain the scanned series of data signals even after an image is formed, whereby said matching means can be adjusted and another image formed.

7. A process for reproducing an image of an original document onto a copy sheet; said process comprising:

scanning an original document once and generating electrical signals representative of the size and image content of a scanned document;

determining the size of a scanned document from a series of electrical signals generated during said one scan of the document;

storing the series of electrical signals representative of the image content of a scanned document generated during said one scan;

matching the size of a copy sheet and the size of the formed image; and forming an image on a copy sheet based on a supplied series of stored electrical signals generated during said one scan of the document.

* * * * *